(12) United States Patent
Fuller

(10) Patent No.: US 7,753,123 B2
(45) Date of Patent: *Jul. 13, 2010

(54) METHOD FOR TREATING A SUBTERRANEAN FORMATION

(75) Inventor: Michael J. Fuller, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/567,604

(22) Filed: Dec. 6, 2006

(65) Prior Publication Data

US 2008/0139412 A1 Jun. 12, 2008

(51) Int. Cl.
*E21B 43/22* (2006.01)
*E21B 43/27* (2006.01)

(52) U.S. Cl. .................... 166/307; 166/279; 166/282; 166/283; 166/300

(58) Field of Classification Search .......... None
See application file for complete search history.

(56) References Cited

U.S. PATENT DOCUMENTS

| | | | |
|---|---|---|---|
| 4,669,545 A | 6/1987 | Slaugh | |
| 5,411,670 A * | 5/1995 | Walker | 507/117 |
| 5,981,447 A | 11/1999 | Chang et al. | |
| 6,342,467 B1 | 1/2002 | Chang et al. | |
| 6,534,448 B1 * | 3/2003 | Brezinski | 507/90 |
| 7,028,775 B2 | 4/2006 | Fu et al. | |
| 7,638,469 B2 | 12/2009 | Heidenfelder et al. | |
| 2006/0035790 A1 | 2/2006 | Okell et al. | |
| 2008/0119374 A1 * | 5/2008 | Willberg et al. | 507/209 |

FOREIGN PATENT DOCUMENTS

| | | |
|---|---|---|
| EP | 1607572 A1 | 12/2005 |
| EP | 1023382 B1 | 3/2006 |
| EP | 1692242 A1 | 8/2006 |
| WO | 2004094557 A1 | 11/2004 |
| WO | 2005071038 A1 | 8/2005 |
| WO | 2006085132 A1 | 8/2006 |
| WO | 2006092438 A1 | 9/2006 |

* cited by examiner

*Primary Examiner*—Zakiya W. Bates
(74) *Attorney, Agent, or Firm*—David Cate; Rachel Greene; Robin Nava

(57) ABSTRACT

Acidizing methods for subterranean formations formed of predominantly siliceous material as well as acidizing compositions. Some methods include injecting into a predominantly siliceous subterranean formation, an aqueous acidic mixture formed by blending an aqueous liquid, a fluoride source, and an effective amount of an alkane sulfonic acid, preferably methane sulfonic acid, to adjust the pH of the fluid where the alkane sulfonic acid where the alkane group may be an unbranched, a branched or a cyclic alkyl residue. Hydrofluoric acid (HF) may not be added to the fluid in some embodiments as the fluoride source, such as the case for an HF free fluid, and, in some instances, hydrochloric acid is not added to the fluid to adjust pH. Also described are compositions containing an aqueous acidic mixture formed by blending an aqueous liquid, a fluoride source, and an effective amount of an alkane sulfonic acid to adjust pH.

19 Claims, No Drawings

METHOD FOR TREATING A SUBTERRANEAN FORMATION

TECHNICAL FIELD OF THE INVENTION

This invention relates to improving the production of fluids from wells penetrating subterranean formations. More particularly, the invention relates to acidizing methods as applied in subterranean formations formed of siliceous material.

BACKGROUND OF THE INVENTION

The statements in this section merely provide background information related to the present disclosure and may not constitute prior art.

The flow of fluids through porous media, for example the production of fluids from subterranean formations, may be governed by three principle factors, namely the size of the flow path, the permeability of the flow path, and the driving force. It is often necessary to stimulate the production of fluids from a subterranean formation when a well is not producing satisfactorily. The failure to produce is typically due to an inadequate, or damaged, paths for fluids to flow from the formation to the wellbore. This may be because the formation inherently has insufficient porosity and/or permeability or because the porosity and/or permeability have been decreased (damaged) near the wellbore during drilling and/or completion and/or production.

In sandstone reservoirs, production is often limited by either naturally occurring or induced damage that partially plugs the pore spaces in the formation matrix proximate or near the wellbore and hence reduces the effective permeability (flow capacity) of the formation. In such cases a stimulation treatment is performed by either injecting acid/chemicals to remove the damage in the formation, at pressures which do not exceed the fracture gradient of the formation (matrix stimulation), or bypassing the damage by propped fracturing treatment. A commonly employed treatment is matrix acidizing.

In matrix acidizing, the typical treatment fluids used to dissolve clays and other aluminosilicate minerals are "mud acid" formulations, which are essentially strongly acidic solutions that contain hydrofluoric acid (HF). In sandstone matrix stimulation, maximizing the dissolution of aluminosilicate while minimizing precipitation reactions during the main treatment stage of fluid is a typical objective. Minimizing precipitation will limit the potential for damage to the overall formation integrity.

However, at high temperatures the dissolution reactions in a sandstone matrix may be so rapid that the resulting precipitation reactions are often uncontrollable. To account for this, organic acid/HF blends began to be used in matrix acidizing for retarded dissolution of aluminosilicate. The slower reactions of organic acids allowed greater control over the dissolution (and precipitation) kinetics at higher temperatures.

HF can be generated in solutions for sandstone acidizing either by mixing of concentrated solutions of HF or by adding an alternative HF-source such as ammonium fluoride or ammonium bifluoride (ABF). Unfortunately, most organic acids used in matrix acidizing fluids have higher-pH values when mixed alone with ammonium bifluoride due to the higher pKa values of organic acids (compared to strong mineral acids). This poses two potential problems with organic acids in matrix applications. First, aluminum fluoride and several other reaction byproducts precipitate faster at higher fluid pH. Additionally, if the fluid, has a higher-pH as prepared, the added ammonium bifluoride in solution may not be fully protonated to HF. In order to combat both of these risks, mineral acid is often added to these blends. Currently, hydrochloric acid (HCl) is added to these mixtures to maintain low-pH. However, in some locations, the procurement or availability of HCl can be limited.

Accordingly, there is a need for sandstone acidizing treatments and composition which are based upon alternative acids to mineral acids. This need is met, at least in part, by the following invention.

SUMMARY OF THE INVENTION

This invention relates to improving the production of fluids from wells penetrating subterranean formations, and in particular, acidizing methods for subterranean formations formed of predominantly siliceous material. In one aspect, some embodiments of the invention are treatment methods for increasing permeability, where the methods include injecting an aqueous acidic mixture formed by blending an aqueous liquid, a fluoride source, and an effective amount of an alkane sulfonic acid to adjust the pH of the fluid to about 3 or less, where the alkane group of the alkane sulfonic acid may be an unbranched, a branched or a cyclic alkyl residue. In some embodiments, the pH is less than or equal to about 2.7. Also, hydrofluoric acid may not be added to the fluid in some instance, as the fluoride source, such as the case for an HF free fluid; and, in some instances, hydrochloric acid is not added to the fluid to adjust pH.

Another embodiment of the invention includes treating a subterranean formation penetrated by a wellbore to increase formation permeability, where the method involves injecting into the formation an amount of an aqueous acidic mixture formed by blending an aqueous liquid, ammonium bifluoride, and an alkane sulfonic acid. In yet another embodiment, the method is based upon injecting into the formation an aqueous acidic mixture formed by blending an aqueous liquid, fluoride source, and methane sulfonic acid.

Yet other embodiments of the invention are compositions including an aqueous liquid, a fluoride source, and an effective amount of an alkane sulfonic acid to adjust the pH of the fluid to about 5 or less. Preferably the pH less than or equal to about 4, more preferably equal to or less than 3, and even more preferably equal to or less than 2.7. In these compositions, hydrofluoric acid may or may not be added to the composition as the fluoride source, and hydrochloric acid may or may not be added to the fluid to adjust pH. Any suitable fluoride source may be used, including, but not limited to, HF, fluoboric acid, ammonium bifluoride, ammonium fluoride, and the like. The compositions may also include boric acid, or at least one organic acid, or any combination thereof. The preferable alkane sulfonic acid is methane sulfonic acid.

In another aspect of the invention, an acid preflush not containing fluoride is injected prior to the injection into the formation of the aqueous acidic mixture. The preflush is injected to substantially remove carbonates present within the mineralogy of the formation zone to be treated.

In yet another aspect of the invention, a viscosified acid based fluid is injected to create a fracture within the formation, after injection of the aqueous acidic mixture; and, in a further optional stage, a viscosified fluid is injected after the injection of the viscosified acid based fluid.

As discussed above, some preferred fluoride sources which are added or formed in solution, include, but are not limited to fluoboric acid, ammonium bifluoride is added to the fluid as the fluoride source, ammonium fluoride, and the like. In some embodiments, the fluid further contains boric acid, one or more organic acids, or mixture thereof. Some nonlimiting examples of suitable organic acids include formic acid, acetic acid, lactic acid, glycolic acid, sulfamic acid, malic acid, citric acid, tartaric acid, maleic acid, methylsulfamic acid, chloroacetic acid. Also, chelating agent such as maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriamine-pentaacetic acid, ammonium salts thereof, lithium salts thereof, sodium salts thereof, and mixtures thereof may be optionally included in fluid used in embodiments of the invention. Further, embodiments may also employ one or more of any other chemical components/additives readily known to those of skill in the art, including, but not necessarily limited to mutual solvents, surfactants, polymers, buffers, viscosity enhancers, shear recovery agents, lactide polymers, an unsubstituted lactide polymers, glycolide polymers, polylactic acid polymers, polyglycolic acid polymers, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid or hydroxycarboxylic acid-containing moieties, or proppants, and the like.

Methods and/or compositions of the invention may be used in any suitable application, such as matrix stimulation (matrix dissolution, matrix acidizing), acidizing, in industrial and household cleaners, in scale dissolution in wellbores, in filtercake cleanup, in mudcake removal, scale removal, wellbore cleanout, gravel pack cleanout, coiled tubing cleanout, casing cleanout, and the like, as well as in any other uses of acidic fluids in the oilfield, and elsewhere.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The principles and the methods described below apply to any sandstone, and related, mineral types, although they will be discussed in terms of sandstone. Formations that are considered to be sandstone may contain some carbonates. Where carbonates are substantially present within the mineralogy of the formation zone to be treated, an acid preflush not containing fluoride may be, but not necessarily, injected prior to the primary acidizing treatment fluids which include fluoride. Also, when we are describing situations in which the acid reacts with the first material with which it comes into contact, we will describe the location of that reaction as "near the wellbore" although, of course, there can be situations in which the location where the majority of the acid first comes into contact with the formation is further away, for example when there are natural very high-conductivity streaks, or fractures or vugs. In this situation, "near the wellbore" should be interpreted as meaning primarily in the localized area most readily accessible to the acid.

The invention relates to acidizing methods and compositions, useful for subterranean formations comprising siliceous material (also referred to herein as "sandstone"). Particularly, the methods and compositions of the invention are based upon acidizing fluids which include alkane sulfonic acids as the primary pH reduction agent, serving to reduce the fluid pH in fluoride based acidizing fluids and methods. Examples of fluids for which alkane sulfonic acid (also referred to herein as "ASA"), such as methane sulfonic acid (also referred to herein as "MSA") by nonlimiting example, is used in accordance with the invention, includes, but are not limited to, matrix acidizing fluids, acidizing fluids, organic mud acid, organic clay acid, and the like. In some embodiments, organic acids are often used in conjunction with HF, or HF source, and ASA for sandstone reservoir stimulation, as they are capable of retarding dissolution of damaging minerals in matrix acidizing fluids, and in some instances, the organic acids are combined with hydrofluoric acid, leading to a synergistic dissolution mechanism where the HF attacks the mineral surface and the organic acid may coordinate with generated cations. In some other embodiments, HF is generated in solution by acidifying an HF source, such as, but not necessarily limited to, ammonium bifluoride and/or ammonium fluoride, to dispense concentrated solutions of HF. It is also within the scope of some embodiments of the invention that methane sulfonic acid adjusts the fluid pH comparably with HCl at similar volumetric loading, whereby the MSA protonates fluoride to form HF. Additionally, blends of organic acid/ammonium bifluoride/methanesulfonic acid may have a similar capacity to dissolve aluminosilicates minerals (such as kaolinite) as compared with blends of organic acid/ammonium bifluoride/HCl. Additionally, ASA could likely be used in other fluid applications as replacements for hydrochloric acid in other oilfield fluids requiring a pH reducer.

Fluids of and used according to the invention are acid treatment fluids containing a dissolving agent such as, but not necessarily limited to, source of fluoride, and methane sulfonic acid to reduce pH and effectively protonate the fluoride. In some embodiments, a chelant and/or organic acid may be included as well. While the invention is not bound by any particular mechanism or theories of operation, a concept which may describe the function of the invention follows. As described above, the inventor has discovered that organic acid/HF solutions prepared using alkane sulfonic acid added with ammonium bifluoride (also referred to herein as "ABF") leads to comparable dissolution of aluminosilicate as similar solutions prepared using concentrated hydrochloric acid to adjust pH. This includes acidic blends of organic acid and ABF as well as acidic blends of organic acid/boric acid with ABF. In either of these fluids, alkane sulfonic acid provides a sufficient concentration of $H^+$ cations to protonate an adequate amount of fluoride (also referred to as "fluoride anions"), thus forming HF to react with aluminosilicates. Alkane sulfonic acid may also lower the pH of the overall treatment fluid in order to minimize reprecipitation of cations after initial dissolution. In accordance with invention, HF can either be batch mixed into these fluids from concentrated solutions or can be formed by adding ammonium fluoride or ammonium bifluoride, by nonlimiting example, with a strong acid. In some embodiments, the fluids are single acid treatment fluids, while in some others, there may be a plurality of fluids used in the acid treatments.

According to the invention, certain water soluble alkane sulfonic acids are used. Evidently, mixtures of different alkane sulfonic acids may also be used. Alkane sulfonic acids have the general formula: $R^1$—$SO_3H$, wherein $R^1$ represents an unbranched, a branched, or a cyclic alkyl residue. The one skilled in the art selects the residue under the premise that the alkane sulfonic acid has to maintain sufficient solubility in fluid medium, and this may depend on the respective application for which the concentration is required. Generally, $R^1$ stands for an unbranched or branched $C_1$- to $C_6$-alkyl residue, preferably for a $C_1$- to $C_4$-alkyl residue.

The use of methane sulfonic acid (abbreviation MSA, formula $CH_3$—$SO_3H$) is particularly preferred. Methane sulfonic acid is a very strong acid (pKa=−2) as showed in table 1 below, in comparison with many other acids, but in contrast to HCl, its vapor pressure is low. Thus, it is particularly suited for the use at higher temperatures. Methane sulfonic acid can be advantageously used for the treatment of rock formations with a temperature of at least 60° C., particularly of 60 to 250° C. Preferably the temperature of the rock formations to be treated ranges from 100 to 240° C. and especially preferred from 120 to 230° C., most especially preferred from 140 to 220° C. and for example from 160 to 220° C. Evidently, it can also be used at lower temperatures, for example at temperatures starting at 20° C.

TABLE I

| Name | Chemical formula | pKa |
|---|---|---|
| Sulfuric acid | $H_2SO_4$ | −10 |
| Hydrobromic acid | HBr | −9 |
| Hydrochloric acid | HCl | −7 |
| Methanesulfonic acid | $(CH_3)SO_3H$ | −2 |
| Nitric acid | $HNO_3$ | −1.5 |
| Trifluoroacetic acid | $(CF_3)COOH$ | 0.5 |
| Citric acid | $C(OH)(CH_2CO_2H)_2CO_2H$ | 3.13 ($pK_1$) |
| Formic acid | HCOOH | 3.75 |
| Hydrofluoric acid | HF | 4 |
| Acetic acid | $(CH_3)COOH$ | 4.75 |
| Hydrogen sulfide | $H_2S$ | 7 |

Pure, 100% MSA may be used. An acidic, aqueous solution of MSA, however, is preferred. The solvent in which the MSA is dissolved is preferably water, but it may also contain low amounts of organic solvents which can be mixed with water. Such solvents may be alcohols, for example methanol, ethanol or propanol, by nonlimiting example. Generally, the amount of water is of at least 80 weight percent, preferably 90 weight percent and especially preferred 95 weight percent, respectively in relation to the total amount of all solvents used.

The ASA concentration in the solution or respectively in the formulation is selected by the one skilled in the art according to the intended application. A concentration of at least about 0.1 weight percent based upon total fluid weight, preferably at least about 1 weight percent based upon total fluid weight, especially preferred at least about 2 weight percent based upon total fluid weight, and most especially preferred at least about 4 weight percent based upon total fluid weight. Also, where the ASA is MSA, the concentration of MSA may range from about 0.1 weight percent based upon total fluid weight to about 10 weight percent based upon total fluid weight, with a lower limit of MSA being no less than about 0.1, 0.3, 0.5, 0.7, 0.9, 1, 2, 3, 4, 5, 6, 7, 8, or 9 weight percent based upon total fluid weight, and the upper limited being less than about 10 weight percent based upon total fluid weight, no greater than about 9, 8, 7, 6, 5, 4, 3, 2, 1, 0.8, 0.6, 0.4, or 0.2 weight percent based upon total fluid weight.

Fluids of, and used according to the invention may optionally contain a chelating agent. Some nonlimiting examples of suitable chelating agents include malic acid, tartaric acid, citric acid, certain aminopolycarboxylate and polyaminopolycarboxylate chelating agents (such as, by non-limiting example, NTA (nitrilotriacetic acid), HEIDA (hydroxyethlimnodiacetic acid), HEDTA (hydroxyethylethylenediaminetetraacetic acid, EDTA (ethylenediaminetetraacetic acid), CyDTA (cyclohexylenediaminetetraacetic acid), DTPA (diethylenetriamine-pentaacetic acid)) and certain aminopolymethylenephosphonic acid chelating agents and some of their salts. The criteria for the selection of the chelating agent ("chelant") may be that the log of the stability constant ([Al(III)L]/[Al(III)][L]), where L is the chelating agent, should be greater than about 5, and that the free acid of the chelant should be soluble under the conditions of use. The criteria for the selection of the salt cation may be based upon the pH and on what other materials are present. Ammonium is the preferred cation and can be used under any conditions under which the fluid embodiments of the invention would be used in the oilfield. Sodium and lithium may be used at conditions under which their fluorides are soluble. Potassium should preferably not be used because there are potassium-aluminum and potassium-silicon compounds that would precipitate. The chelating acid or its salt is preferably present in an amount between about 10 and about 40 weight percent, more preferably between about 15 and about 30, and most preferably between about 20 and about 25. The process can be conducted from about 150° F. (66° C.) to about 400° F. (198° C.).

Some of the important reactions occurring in sandstone matrix stimulation when the sandstone contains clay, and when ammonium and chelant are present and HF is generated from ammonium bifluoride, are shown below:

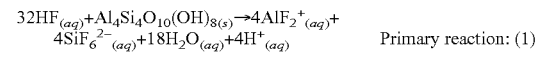

Primary reaction: (1)

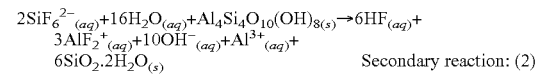

Secondary reaction: (2)

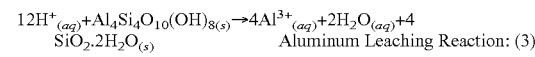

Aluminum Leaching Reaction: (3)

Amorphous silica HF reaction: (4)

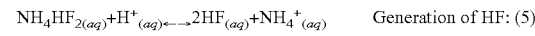

Generation of HF: (5)

Precipitation of Al: (6)

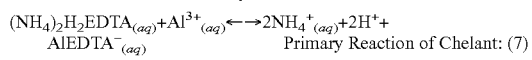
Primary Reaction of Chelant: (7)

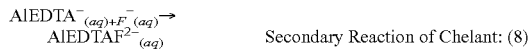
Secondary Reaction of Chelant: (8)

A key problem is that initially-dissolved silicon, in the form of $SiF_6^{-2}$ reacts with clays to form solid amorphous silica and aluminum fluorides that may then precipitate. The problem is particularly serious at higher temperatures, above for example about 150° F. (66° C.). Of course, there are many other species present in solution and as solids, and many other reactions taking place, some to completion and some in equilibrium. The actual compositions and amounts of species present depend upon many factors, in particular the fluids and solids initially present, the temperature, and the time. The accuracy with which the actual species present in solution and as solids can be determined (or predicted) depends upon the complexity of the system and the number of reactions taken into consideration. Simple laboratory experiments may be characterized accurately by calculation and/or measurement; real field situations may be approximated to an extent dependent upon how well the initial conditions are known and how complex a model is used. Computer models are invaluable when considering real field situations.

Not to be limited by theory, but it is believed that if the chelating agents have a stability constant greater than about 5, then the aluminum ions in solution (resulting from the primary dissolution reaction of aluminum-containing minerals and compounds) are present primarily in the chelated form. In the absence of an appropriate chelating agent, these aluminum ions would be present in solution primarily as aluminum fluoride salts or would precipitate, for example as $NH_4AlF_4$ if sufficient ammonium were present. Also, in the absence of the chelating agent, gibbsite ($Al(OH)_3$) could precipitate. Since a common form of soluble aluminum fluoride salt is $AlF_2^+$ and a common form of soluble silicon fluoride is $H_2SiF_6$, then the amount of fluoride required to maintain silicon in solution might be three times the amount of fluoride required to maintain aluminum in solution (or one and one half times the amount of fluoride that is lost from the system if the aluminum is precipitated as $NH_4AlF_4$). Of course there are many possible soluble aluminum-containing species, having up to six fluorides per aluminum; there are also many possible aluminum-containing solids, containing up to about four fluorides per aluminum. Note that precipitation of aluminum typically consumes more fluoride than maintaining aluminum in solution. In general, therefore, keeping the most silicon in solution as possible would typically be accomplished by keeping as much aluminum as possible in solution, although that may not always be the case. In the absence of the chelating agent, the aluminum is held in solution primarily by fluoride, or precipitated as a fluoride, and then silicon precipitates because there is insufficient fluoride to hold it in solution. In the presence of the chelating agent, the aluminum is held in solution by the chelating agent and the silicon is held in solution by the fluoride. The precipitation of an aluminum fluoride salt removes one aluminum and four fluorides from the solution. Stabilization of a silicon in solution requires six fluorides. In the presence of an appropriate chelating agent, such as EDTA, aluminum is complexed by both EDTA and one fluoride, allowing more fluoride to be available to stabilize silicon. We have found that by carefully controlling the pH in the presence of the proper chelating agents, and by simultaneously ensuring that the optimal amounts of ammonium and fluoride are available, the effectiveness of sandstone matrix stimulation is optimized. Only a narrow range of concentrations of ammonium and fluoride may be effective.

Re-precipitation of initially-dissolved silicon as amorphous silica can be responsible for much of the damage observed in sandstone matrix stimulation. Furthermore, re-precipitation of any solids onto minerals that otherwise could be dissolved can substantially slow or stop the matrix dissolution. Therefore, some method embodiments of the inventions are those in which initially-dissolved aluminum does not remove a lot of fluoride from the solution, so that fluoride remains available to keep silicon in solution. This can be determined by controlling the nature of the species in solution. This, in turn, can be achieved by the proper control of the amounts of ammonium, ASA provided hydrogen ion (pH), fluoride, and optional chelant, given the choice of chelant and the nature and amounts of the solids (for example formation silica, formation aluminosilicates, other natural minerals, precipitates resulting from oilfield operations, drilling fluid components, scales, or other materials). Of particular importance in some of these embodiments is the acid capacity of the system (i.e. the amount of acid consumed by reactions), for example, the amount of carbonate present in predominantly sandstone based formations. In situations where carbonate is substantially present, an acid preflush may be conducted to significantly remove the carbonates prior to the main acidizing treatment.

The rate of dissolution is important in sandstone matrix stimulation because it has an effect (as does the amount of dissolution) on the location and nature of dissolution. Most important is whether dissolution is localized near the wellbore or extends deep into the formation. Either might be preferred, depending upon the reason for the treatment. The rates (and amounts) of dissolution are, of course, affected by the concentrations of dissolution agents. The dissolution reaction can be slowed, however, without decreasing the ultimate amount of dissolution by retarding the rate of generation of the HF. Although there are physical ways to do this, for example by using the dissolution fluid in the form of an emulsion, a useful approach is to use boric acid ($H_3BO_3$) which reacts with the HF as it is initially generated from the ammonium bifluoride to form fluoboric acid ($HBF_4$) which then releases HF to the system more slowly. One advantage of using boric acid to slow the reactions is that boric acid may also be useful as a clay control additive to minimize the movement of fines.

In some embodiments of the invention, the preferred source of fluoride is ammonium bifluoride, although others sources of fluoride may be used, such as ammonium fluoride, fluoboric acid, and HF. When the fluoride source is ammonium bifluoride, it is present in an amount between about 0.5 and about 6 weight percent based upon total fluid weight, preferably between about 1 and about 5 weight percent based upon total fluid weight, most preferably between about 1 and about 2 weight percent based upon total fluid weight. When the fluoride source is ammonium fluoride, it is present in an amount between about 1 and about 8 weight percent based upon total fluid weight, preferably between about 3 and about 7 weight percent based upon total fluid weight, and most preferably between about 5 and about 7 weight percent based upon total fluid weight.

The sandstone matrix stimulation fluid embodiments may advantageously be formulated with mutual solvents as components. A preferred mutual solvent is dipropylene glycol methyl ether (DPM). Mutual solvents are used to water-wet the formation and to help dissolve small amounts of organic compounds; mutual solvents are preferably included in a concentration of from about 2 to about 10 weight percent. Other suitable mutual solvents include, by non-limiting example, ethyleneglycolmonobutyl ether, propylene glycol and dipropylene glycol substituted on one or both hydroxyls with methyl, acetate, acrylate, ethyl, propyl or butyl.

The sandstone matrix stimulation fluid embodiments may also advantageously be formulated with certain surfactants for the purposes of water wetting the formation, lowering the surface tension and dispersing fines. A typical suitable surfactant is cocamidopropyl betaine. Other suitable surfactants are ammonium $C_6$-$C_{10}$ alcohol ethoxysulfate or alcohols, $C_6$-$C_{10}$ ethoxylated quaternary compounds, and many different types of ammonium quaternary compounds.

Sandstone matrix stimulation fluids typically should contain corrosion inhibitors if their pH's are below about 10. Conventional corrosion inhibitors may be used as long as they are suitable for use with and compatible with organic acids or chelating agents. Compounds containing ammonium quaternary moieties and sulfur compounds are suitable (see for example U.S. Pat. No. 6,521,028). Sandstone matrix stimulation fluid embodiments of the invention may also contain many other additives commonly used in oilfield treatment fluids, such as clay control additives, viscosifiers, wetting agents, emulsifiers, agents to prevent the formation of emulsions, and foaming agents. It is to be understood that whenever any additives are included, laboratory tests should be performed to ensure that the additives do not affect the performance of the fluid.

A gas component may optionally be incorporated into some embodiments of the invention. The gas component may be produced from any suitable gas that forms an energized fluid or foam when introduced into the aqueous medium. See, for example, U.S. Pat. No. 3,937,283 (Blauer et al.) hereinafter incorporated by reference. Preferably, the gas component comprises a gas selected from the group consisting of nitrogen, air, argon, carbon dioxide, and any mixtures thereof. More preferably the gas component comprises carbon dioxide, in any quality readily available. The gas component may assist in the fracturing and acidizing operation, as well as the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

Although we have used and will continue to use the term "acidizing" as it is so ingrained in the industry, instead of the term "acid", often the use of other terms such "formation dissolving fluid", "viscous dissolving fluid" or "dissolving agent" have the same meaning, because acids are not the only reactive fluids that will dissolve formation minerals. In addition to gelled acids, which use either inorganic or organic acids, or mixtures of these conventional acids, or even unconventional reactive fluids which use mainly chelant systems, which have been developed and have been shown to acidize sandstone reservoir formations when the overall process of stimulation is optimized. Examples of unconventional formation-dissolving fluids include aminopolycarboxylic acids and their salts, which are sometimes called "non-acid reactive solutions" or NARS when they are basic. In addition, novel acid systems, that are viscoelastic surfactant systems that may change viscosity dramatically as a function of pH, are also available for this application that could enhance more generation of wormholes from the fracture surface.

The reactivity of the formation-dissolving fluid may be selected (for example with the use of fracture and/or acidizing simulator computer programs) on the basis of the flow rate and formation and fluid parameters. The reactivity of the formation-dissolving fluid can be controlled by varying the rate of reaction, the rate of mass transfer, or both. For example, the rate of reaction can be decreased by changing the type of formation-dissolving fluid, by changing the form of the fluid from a solution to an emulsion, by adding appropriate salts (which change the equilibrium constant for the surface reaction), or by increasing the pH of the formation-dissolving fluid. The rate of reaction can also be decreased by changing the physical processing conditions (e.g., by reducing the pump flow rate and/or pumping pressure, or by cooling the formation-dissolving fluid using external cooling means or internal cooling means (e.g., pumping a large pad stage, or by adding nitrogen or other gas that is inert in the process).

The pH of the fluids employed in the invention may be varied widely. Accordingly, pH may be up to about 7. In some embodiments, the pH is about 5 or less, preferably 4 or less, more preferably about 3 or less, or even more preferably about 2.7 or less. The fluid may or may not contain a buffer to maintain fluid pH at a desired value. Useful buffers are readily known to those with skill in the art. For purposes herein, pH values are determined at typical laboratory or surface test conditions, namely ambient pressure and temperature of about 25° C.

To overcome the problem of reaction products (from the reaction of fluoride with the minerals in the formation matrix) precipitating in the pores, which could result in a decrease in formation permeability after acidizing, further incorporated into the fluid may be organic acids, such as by non-limiting example, formic acid, acetic acid, lactic acid, glycolic acid, sulfamic acid, malic acid, citric acid, tartaric acid, maleic acid, methylsulfamic acid, chloroacetic acid, whose reactivities could be further adjusted by including varying amounts of sodium acetate or sodium formate respectively; chelating agents such as aminopolycarboxylic acids (such as ethylenediaminetetraacetic acid or hydroxyethylethylenediaminetriacetic acid (HEDTA), whose reactivities could be further adjusted by converting them partially or completely into sodium, potassium or ammonium salts or by adjusting the pH with, for example ASA); or retarded mineral acids (such as gelled or emulsified ASA or HCl, whose reactivity could be further adjusted by manipulation of the choice of and concentration of surfactant and of the oil/water ratio). The organic acids may also be capable of chelating the metal cations generated in solution, minimizing their tendencies to precipitate. In some formulations, the inclusion of boric acid with the organic acid/HF mixture allows even further retardation of the dissolution kinetics and also provides a mechanism for fines migration control (via the formation of borosilicate bonds that lock mobile fines in place).

The chelating agents useful herein are a known class of materials having many members. The class of chelating agents includes, for example but not necessarily limited to, aminopolycarboxylic acids and phosphonic acids and sodium, potassium and ammonium salts thereof. HEDTA and HEIDA (hydroxyethyliminodiacetic acid) are useful in the present process; the free acids and their Na, K, $NH_4^+$ salts (and Ca salts) are soluble in strong acid as well as at high pH, so they may be more readily used at any pH and in combination with any other reactive fluids (e.g., HCl). Other aminopolycarboxylic acid members, including EDTA, NTA (nitrilotriacetic acid), DTPA (diethylenetriaminepentaacetic acid), and CDTA (cyclohexylenediaminetetraacetic acid) are also suitable. At low pH these latter acids and their salts may be less soluble. Examples of suitable phosphonic acids and their salts, include ATMP: aminotri(methylenephosphonic acid); HEDP: 1-hydroxyethylidene-1,1-phosphonic acid; HDT-MPA: hexamethylenediaminetetra(methylenephosphonic acid); DTPMPA: diethylenediaminepentamethylenephosphonic acid; and 2-phosphonobutane-1,2,4-tricarboxylic acid. All these phosphonic acids are available from Solutia, Inc., St. Louis, Mo., USA, as DEQUEST (Registered Trademark of Solutia) phosphonates. Such materials are known in the oilfield. Particularly preferred chelant-based dissolvers are those containing hydroxyethylaminocarboxylic acids such as hydroxyethylethylenediaminetriacetic acid (HEDTA), hydroxyethyliminodiacetic acid (HEIDA), or a mixture thereof, as described in U.S. Pat. No. 6,436,880, which has a common assignee as the present application, and which is hereby incorporated in its entirety.

When present, the chelating agents, retarded mineral acids, or organic acids are present in an amount between about 1% and about 40% by weight based upon total weight of treatment fluid, preferably between about 5% and about 30% by weight based upon total weight of treatment fluid, more preferably between about 10% and about 20% by weight based upon total weight of treatment fluid.

As described above, the fluid may contain hydrogen fluoride, which may be actually hydrogen fluoride added to the fluid, or HF provided from a source. Examples of HF sources include ammonium fluoride and/or ammonium bifluoride or mixtures of the two. When strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON™ synthetic resinous fluorine-containing polymer, and mixtures. Generally, the hydrogen fluoride source is present in an amount from between about 0.1% and about 10% by weight based upon total weight of treatment fluid, preferably between about 0.5% and about 8% by weight based upon total weight of treatment fluid, more preferably between about 1% and about 7% by weight based upon total weight of treatment fluid, and most preferably between about 3% and about 7% by weight based upon total weight of treatment fluid. Other specific fluoride sources may have differing ranges, such as those described hereinabove for ammonium fluoride and ammonium bifluoride.

The sequence of blending the components of the aqueous acidic mixture of the invention is not critical, i.e., the components or aqueous solutions thereof may be blended in any desired order or sequence. Preferably, however, in the embodiments of the invention where a boron source is to be blended in the aqueous liquid, and where the boron source is of limited solubility, the acid, etc. chelant for aluminum and aluminum fluoride species and the fluoride ion source, or HF, are blended first with the aqueous liquid, followed by the blending or addition of the boron source. For example, the desired amounts of citric acid or N-(2-hydroxyethyl)ethylenediaminetriacetic acid (HEDTA) and ammonium bifluoride may be mixed with fresh water in a mixing vessel until dissolved. Thereafter, a boron source, such as boric acid, may be added to the vessel. The boric acid is preferably added last since it does not easily dissolve in fresh water, but will readily be taken up by the acid-containing solution. Although the compositions may be blended offsite, they will normally be blended at the surface proximate the well site, or on the fly, and pumped down well to the site selected for treatment, which may be isolated by suitable means as is known in the art. Alternatively, they may be blended as concentrates, and then diluted at the well site, either on the surface, or on the fly. Compositions or solutions used according to the invention may be In the embodiment wherein HF and a boron source are used to form fluoboric acid in the aqueous liquid, the relative concentrations or ratios of boron source, e.g., boric acid, and hydrofluoric acid used in preparing the mixture can be adjusted to tie up all of the free hydrofluoric acid (e.g. as the reaction product of fluoboric acid) or to leave some excess hydrofluoric acid (e.g. unreacted with the boron source). By adjusting the relative amounts of hydrofluoric acid to boron source in the mixture, fine tuning of the amount of free hydrofluoric acid in the composition of the invention may be achieved. Where excess HF is present, the amount of excess HF will preferably be less than about 1 percent.

In general, the components used in formulating the compositions of the invention are known and may be obtained from commercial chemical sources, or they may be prepared by well known procedures. For example, fluoboric acid, HF, methane sulfonic acid, various fluoride ion sources, such as ammonium bifluoride, various acids or ammonium or potassium salts which chelate aluminum or aluminum fluoride species, such as citric acid and N-(2-hydroxyethyl)ethylenediaminetriacetic acid, and various boron sources, such as boric acid, may be obtained readily. Commercial grade components may be utilized, of standard strengths available, so long as any extraneous species present therewith do not interfere significantly with the formulation of or function of the compositions of the invention. As used herein, the expression "aluminum fluoride species" refers to aluminum and fluorine-containing anions formed by reactions of one or more components of the aqueous liquid with components of the subterranean formation. Assuming that the principal reaction is, as conventionally understood, with HF from the fluoboric acid in the aqueous fluid, the reaction equation is shown, as follows:

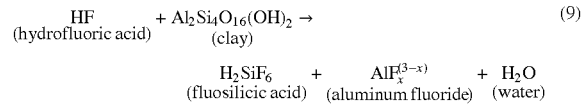

$$\underset{\text{(hydrofluoric acid)}}{\text{HF}} + \underset{\text{(clay)}}{\text{Al}_2\text{Si}_4\text{O}_{16}(\text{OH})_2} \rightarrow \underset{\text{(fluosilicic acid)}}{\text{H}_2\text{SiF}_6} + \underset{\text{(aluminum fluoride)}}{\text{AlF}_x^{(3-x)}} + \underset{\text{(water)}}{\text{H}_2\text{O}} \quad (9)$$

wherein $x$ is a number from 1 to 6.

Actually, this is believed to be only the initial stage of a complex reaction sequence. Depending on the free fluoride concentration, aluminum fluorides are believed present as $Al^{3+}$, $AlF_2^+$, $AlF_2^+$, $AlF_3$, $AlF_4^-$, $AlF_5^{2-}$, and $AlF6^{3-}$. Silicon fluorides may exist as $SiF_4$, $SiF_5^{1-}$, and $SiF_6^{2-}$. The silicon fluorides and more-fluoride-rich aluminum species are believed to react with additional clay, extracting aluminum and perhaps precipitating hydrated silica. For example, fluosilicic acid may react with additional clay to yield a hydrated silica, i.e., silica gel, a soluble aluminum fluoride species and other byproducts.

Importantly, several embodiments of the invention composition further include an effective amount of an acid, or mixture of acids, which chelate aluminum ions and aluminum fluoride species, or an ammonium or potassium salt or salts of such acids, or a mixture thereof. As also indicated, in the case where HF is used, a greater variety of sequestering compounds may be employed. While not wishing to be bound by any theory of invention, it is believed that the sequestering of the aluminum and/or aluminum fluoride species by the acid(s), or ammonium or potassium salt(s) thereof, or sequestering compound or compounds, frees fluoride ions to associate in solution with silicon ions and maintain the solubility thereof.

When the formation-dissolving agent is a strong acid, the fluid preferably contains a corrosion inhibitor. The fluid may optionally contain chelating agents for polyvalent cations, for example especially aluminum, calcium and iron (in which case the agents are often called iron sequestering agents) to prevent their precipitation. Some of the formation-dissolving agents just described are such chelating agents as well.

Fluids useful in the invention may also include a viscosifier that may be a polymer that is either crosslinked or linear, a viscoelastic surfactant, or any combination thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published U.S. Pat. App. No. US 2004209780, Harris et. al.

In some method embodiments, the viscosifier is a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{18}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG-and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from Cesalpinia spinosa seeds) and guar gum (e.g., from Cyamopsis tetragonoloba seeds). In addition, although embodiments of the present invention may be described or exemplified with reference to guar, such as by reference to hydroxy-$C_1$-$C_4$-alkyl guars, such descriptions apply equally to other galactomannans, as well.

When incorporated, the polymer based viscosifier may be present at any suitable concentration. In various embodiments hereof, the gelling agent can be present in an amount of from about 10 to less than about 60 pounds per thousand gallons of liquid phase, or from about 15 to less than about 40 pounds per thousand gallons, from about 15 to about 35 pounds per thousand gallons, 15 to about 25 pounds per thousand gallons, or even from about 17 to about 22 pounds per thousand gallons. Generally, the gelling agent can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent. Fluids incorporating polymer based viscosifiers based viscosifiers may have any suitable viscosity, preferably a viscosity value of about 50 mPa-s or greater at a shear rate of about 100 s$^{-1}$ at treatment temperature, more preferably about 75 mPa-s or greater at a shear rate of about 100 s$^{-1}$, and even more preferably about 100 mPa-s or greater.

Some fluid systems used in some embodiments of the invention are those made from solutions of certain viscosifying viscoelastic surfactants, in particular certain betaines, optionally in conjunction with co-surfactants or lower alcohols. Examples are described in U.S. Pat. No. 6,399,546, U.S. patent application Ser. No. 10/054,161, and U.S. patent application Ser. No. 10/065,144, all of which have a common assignee as the present application, and all of which are hereby incorporated in their entirety. Some viscoelastic surfactant fluid systems may be used at initial surfactant concentrations providing with much higher viscosity than would previously have been thought possible for sandstone acidizing fluids, particularly single acidizing fluids. In matrix treatments, for example, this initial fluid system forms wormholes and then gels at or near the tip of the wormhole, causing diversion. In acid fracturing, for example, this initial fluid gels where leakoff is high, and so this fluid system may help control leakoff.

Many cationic viscoelastic surfactants may be used to viscosify fluids used according to the invention, but certain cationic surfactants are preferred. Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

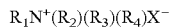

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a C1 to about C6 aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available viscoelastic surfactant (VES) concentrate formulations, for example cationic viscoelastic surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates or polysulfonic acids.

Another suitable cationic viscoelastic surfactant is erucyl bis(2-hydroxyethyl)methyl ammonium chloride, ("EMHAC"), also known as (Z)-13 docosenyl-N—N-bis (2-hydroxyethyl)methyl ammonium chloride. It is commonly obtained from manufacturers as a mixture containing about 60 weight percent surfactant in a mixture of isopropanol, ethylene glycol and water. In this patent, when we refer to "EMHAC" we mean such a solution. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris (hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis (hydroxyethyl) ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

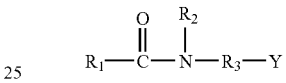

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. More particularly, the zwitterionic surfactant may have the betaine structure:

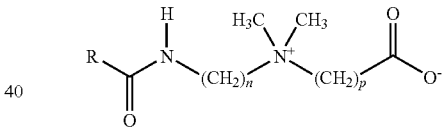

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may also be used.

Two examples of suitable betaines are, respectively, BET-O-30 and BET-E-40. The viscoelastic surfactant in BET-O-30 is oleylamidopropyl betaine. It is designated BET-O-30 here, because as obtained from the supplier (Rhodia, Inc. Cranbury, N.J., U.S.A.) it is called Mirataine BET-O-30; it contains an oleyl acid amide group (including a C17H33 alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains a erucic acid amide group (including a C21H41 alkene tail group) and is supplied as about 40% active ingredient, with the remainder substantially water, sodium chloride, and isopropanol. BET surfactants, and others that are suitable, are described in U.S. Pat. No. 6,703,352.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Patent Application Nos. 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Certain co-surfactants may be useful in extending the brine tolerance, to increase the gel strength, to reduce the shear rehealing time, and/or to reduce the shear sensitivity of zwitterionic viscoelastic surfactant based fluid systems, such as betaine viscoelastic surfactant fluids. An example given in U.S. Pat. No. 6,703,352 is sodium dodecylbenzene sulfonate (SDBS). Another example is polynaphthalene sulfonate. Zwitterionic viscoelastic surfactant's may be used with or without this type of co-surfactant, for example those having a SDBS-like structure having a saturated or unsaturated, branched or straight-chained C6 to C16 chain; further examples of this type of co-surfactant are those having a saturated or unsaturated, branched or straight-chained C8 to C16 chain. Other suitable examples of this type of co-surfactant, especially for BET-O-30, are certain chelating agents such as trisodium hydroxyethylethylenediamine triacetate. Many suitable additives are known for improving the performance of gelled viscoelastic surfactant systems; any may be used in the current invention; they should be tested for compatibility with the compositions and methods of the invention before use; simple laboratory experiments for such testing are well known.

When a VES is incorporated into fluids used in embodiments of the invention, the VES can range from about 0.2% to about 15% by weight of total weight of fluid, preferably from about 0.5% to about 15% by weight of total weight of fluid, more preferably from about 2% to about 10% by weight of total weight of fluid. The lower limit of VES should no less than about 0.2, 0.5, 0.7, 0.9, 1, 2, 3, 4, 5, 6, 7, 8, 9, 10, or 14 percent of total weight of fluid, and the upper limited being no more than about 15 percent of total fluid weight, specifically no greater than about 15, 14, 13, 12, 11, 10, 9, 8, 7, 6, 5, 1, 0.9, 0.7, 0.5 or 0.3 percent of total weight of fluid. Fluids incorporating VES based viscosifiers may have any suitable viscosity, preferably a viscosity value of less than about 100 mPa-s at a shear rate of about 100 $s^{-1}$ at treatment temperature, more preferably less than about 75 mPa-s at a shear rate of about 100 $s^{-1}$, and even more preferably less than about 50 mPa-s.

When incorporated, the aqueous medium of fluids useful of the invention may be water or brine. Where the aqueous medium is a brine, the brine is water comprising optional inorganic salt(s), organic salt(s), or mixture(s) thereof. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

Another type of polymer component may be included in the fluids useful in the invention to achieve a variety of properties including, but not limited to, improving suspension, viscosity enhancement, diversion, particle transport capabilities, and gas phase stability. These polymers may be in the form of fibers or particles or any combination thereof, and may be hydrophilic or hydrophobic in nature, but hydrophilic polymers are preferred. The polymers may also be solids, amorphous or crystalline in nature. When the polymers are fibers, they can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, this polymer component may be included at any suitable concentration, preferably from about 1 to about 15 grams per liter of fluid, more preferably the concentration of fibers are from about 2 to about 12 grams per liter of fluid, and even more preferably from about 2 to about 10 grams per liter of fluid. Also, where the polymer is a condensed acid, such as polylactic acid, polyglycolic acid, copolymers of polylactic acid and polyglycolic acid, or mixture of polylactic acid and polyglycolic acid, in the form of particles, such as beads by nonlimiting example, the polymer may be used as an acid generating component in acidizing or acid fracturing.

Some embodiments of the invention may also include placing proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of treatment fluid. Also, any of the proppant particles can further be coated with a resin to potentially improve the strength, clustering ability, and flow back properties of the proppant.

In some method embodiments of the invention, in addition to sandstone matrix stimulation, fluid compositions of the invention can be used for fracture acidizing of sandstone, drilling mud or filter cake removal, or for proppant pack or gravel pack cleanup, or any similar treatment, as long as the primary solid to be removed is a clay. In these treatments, they can be used as a pre-flush, as the main fluid, or as a post-flush. In viscosified form, in addition to the uses just listed, the fluid embodiments of the invention may be used for hydraulic fracturing, gravel packing, frac-packing, and formation of propped fractures with wormholes as described in U.S. patent application Ser. No. 10/248,540 (filed on Jan. 28, 2003, assigned to Schlumberger Technology Corporation, and hereby incorporated in its entirety). When used in proppant and gravel pack placement or cleanup (of gravel or proppant packs that have been plugged or partially plugged by migrating fines or by precipitates), the fluid embodiments of the invention have an advantage over previously used, more strongly acidic, cleanup fluids because the fluid embodiments of the invention do not cause a loss of crush strength of proppants or gravel. When they are used in pack placement, they allow placement and cleanup in a single step. The oilfield treatments discussed here that can be improved by use of fluids that are embodiments of the present invention are known to those skilled in the art, when performed with previously known fluids, except for the methods disclosed in U.S. patent application Ser. No. 10/248,540. Before using fluid embodiments of the invention in improved method embodiments of the invention, one skilled in the art would perform laboratory tests or computer simulations to ensure that the selected fluid would be efficacious in the intended use; such normal precautions are considered to be within the scope of embodiments of the invention.

The well treatment fluid compositions of embodiments of the present invention can be used to remove clay-containing drilling mud and filter cake from the wellbore. Removal of drilling mud and filter cake occurs especially readily if the mud contains carbonates, especially calcium carbonate, but is normally difficult if the deposit contains clays. Removal of drilling mud can be performed by any technique know in the art, and involves the steps of injecting a well treatment fluid composition of the present invention into the wellbore.

The well treatment fluid compositions of embodiments of the present invention can be used in matrix stimulation of subterranean formations surrounding wellbores. Such matrix stimulation (acidizing) methods generally involve pumping the acid-containing well treatment composition down the wellbore and out through perforations into the target formation. Packers can be used in the wellbore to control the formation zones into which the treatment fluid is injected from the wellbore, if the well has perforations in more than one zone. After the composition has been injected into the formation, optionally the well can be shut in for a period of time to allow more complete reaction between the acid and the formation material. The desired result of the treatment is an increase in the permeability of the formation, for example by the creation or enlargement of passageways through the formation, and therefore an increase in the rate of production of formation fluids such as oil and gas.

Parameters such as pumping rate, pumping time, shut-in time, acid content, and additive package, must be determined for each particular treatment since each of these parameters depends upon the extent of the damage, formation geology (e.g., permeability), formation temperature, depth of the producing zone, etc. A well-treatment designer of ordinary skill is familiar with the essential features of matrix acidizing treatments.

One of ordinary skill in the art will recognize that the well treatment compositions of embodiments of the present invention can be used in the fracture acidizing of a formation. By increasing the pumping pressure (to above the minimum in situ rock stress), a matrix acidizing treatment becomes an acid fracturing treatment. Unlike non-acid fracturing treatments, wherein a proppant is highly desired to hold open the fracture after pumping pressure is released, in acid fracturing treatments, the faces of the fractures formed by the high pressure of pumping are etched by the acid to provide a flowpath for hydrocarbons to the wellbore after pumping pressure is released.

Any suitable sequence of injection, readily to those of skill in the art, can be used in accordance with the invention. One preferred sequence of injection of fluids in sandstone matrix stimulation (acidizing) when fluoride is in the main treatment fluid is a brine pre-flush, followed by an optional acidic pre-flush not including fluoride where substantial carbonate is present within the formation, then the main acidizing treatment fluid is injected, followed by a displacement post-flush. In a typical treatment in which fluoride is introduced into a wellbore or formation, a pre-flush such as a mutual solvent or toluene, xylene, or the like may be employed, if desired, to clean the wellbore and surrounding formation of organic deposits such as paraffins or asphaltenes. Optionally, the pre-flush to remove organic deposits may be followed by a pre-flush of HCl or an organic acid, especially acetic acid, to dissolve carbonates in the formation and thus to ensure that there is no calcium (from calcium carbonate) remaining in the region. In sandstone, an acid pre-flush is commonly a 5 to 15% acid solution containing a corrosion inhibitor. This may help prevent subsequent precipitation of calcium fluoride when fluoride is introduced, and saves more-expensive fluoride or fluoride sources. The displacement post-flush (for oil wells a hydrocarbon like diesel, or 15% acid; for gas wells, acid or a gas like nitrogen or natural gas) also isolates the unspent fluoride from brine that may be used to flush the tubing, as well as restores a water-wet condition to the formation and to any precipitates that did form. The sequence of stages may be repeated. The pre-flush and/or post-flush also help to minimize any incompatibilities between treatment fluids and oil. Though the formulations of embodiments of the invention are compatible with small concentration of non-emulsifying agents and are not highly acidic, to prevent emulsion and sludge that may form from contact of crude oil with acid, it is also a good practice to pre-flush or post-flush the well with a mutual solvent, preferably low molecular weight esters, ether and alcohols, and more preferably ethylene glycol monobutyl ether or DPM. Mutual solvent, such as 10% ethylene glycol monobutyl ether, is used as a post-flush to strip any oil wetting surfactant from the surface and leave it water wet. It is also common to over-flush or post-flush with an aqueous solution containing, for example, 5 percent by weight ammonium chloride or 10 percent glacial acetic acid. In many cases, when fluids that are embodiments of the present invention are used, little or no pre-flush or post-flush is needed. If a post-flush is desired, it need be only ammonium chloride. This is because the fluids that are embodiments of the present invention are more compatible with sodium, potassium calcium and crude oil than most other fluoride-containing treatment fluids.

The optimal amount of ammonium bifluoride for a given treatment in which clay is to be dissolved is dictated primarily by the temperature, by the amount of very readily dissolved material, such as $CaCO_3$, present, and by the presence of cations other than those of silicon and aluminum, such as those of sodium, potassium, and calcium, that may form insoluble fluorides under certain conditions. At low temperatures, such as about 200° F. (about 93° C.), large amounts of silicon can be held in solution, but ammonium-aluminum-fluoride salts precipitate. Most fluid embodiments of the invention stimulate sandstones at low temperatures. At higher temperatures, or in the presence of significant amounts of calcium or magnesium-containing carbonates, the amount of ammonium bifluoride used should be less. For example, at 250° F. (121° C.), Berea sandstone cores are stimulated by a fluid containing 20 weight percent active DAE and 3 weight percent ammonium bifluoride, but are damaged by a fluid containing 20 weight percent active DAE and 5 weight percent ammonium bifluoride. At 300° F. (149° C.), more silicon precipitates and less ammonium bifluoride should be used. Not to be limited by theory, but we believe that these effects are due substantially to changes in the complex equilibria in equations (6-8) above, so that aluminum precipitates as ammonium-aluminum-fluoride salts at low temperatures wile leaving excess fluoride available for maintaining a substantial amount of silicon in solution. At higher temperatures, the ammonium is released from the salt and the chelating agent can leach aluminum (from minerals like clays) which also complexes with the chelating agent and fluoride. For example, we believe that about 2 weight percent ammonium bifluoride may be used with DAE up to about 250° F. (121° C.), or with sandstones having up to about 2 weight percent carbonates, but the limit is about 1 weight percent ammonium bifluoride at higher temperatures, or with sandstones having higher carbonate contents. With carbonate contents above about 5 percent, the ammonium bifluoride should be limited to about 0.5 weight percent. Not to be limited by theory, but we believe that the silica produced by too much ammonium bifluoride is more damaging than the aluminum salts that may precipitate at lower temperatures. In most cases, 1 weight percent ammonium bifluoride will be the concentration of choice; in some cases up to 2 weight percent ammonium bifluoride may be chosen; in a few cases it may be possible to use up to about 5 weight percent ammonium bifluoride.

The key attributes of the fluid embodiments of the invention are that compared to other fluids used to dissolve aluminosilicates downhole, the fluids are calcium-tolerant, iron tolerant, insensitive to the types of aluminosilicates present, can be used over a broad temperature range, and are compatible with crude oil. The fluid embodiments of the invention are used in method embodiments of the invention in conventional ways, except that they may require little or no corrosion inhibition additives or clay control additives, and they may require little or no pre-flush or post-flush treatments. The fluids also may not need to be retarded (for example by viscosifying or by formation of emulsions). However, corrosion inhibitors, clay control additives, pre-flushes, post-flushes, and retarding methods may be used within the scope of embodiments of the invention. The fluids of embodiments of the invention can dissolve as much clay as 9:1 mud acid with simultaneous dissolution of large amounts of calcium, and they give minimal dissolution of zeolites and are less damaging to acid-sensitive clays or feldspars than fluids containing HCl or high concentrations of HF. They are also safer for personnel.

In some other embodiments of the invention, a fracturing operation, after main acidizing treatment, using viscous dissolving fluids containing a silicate dissolving agent, such as an acid, chelant, or combination of both (such as those described in U.S. patent application Ser. No. 11/279,207, incorporated in its entirety by reference thereto), where the viscous fluid creates a fracture in the formation. Such methods may create permeable conduits that bypass near wellbore damage. Alternatively, the fracturing operation may use a viscosified fluid which does not contain a dissolving agent. Further, in yet another embodiment, the fracturing operation may use both a viscous dissolving fluid containing a silicate dissolving agent, and viscosified fluid which does not contain a dissolving agent, where the two fluids are used in a tandem arrangement in any suitable order, sequence, or injection occurrences. Proppant may or may not be added to the fluids described in these embodiments. Also, in these embodiments, after injection of the fluid(s) into the formation at a pressure that exceeds the fracture initiation pressure of the formation, the viscous fluid(s) a leaks off into the faces of the fracture to stimulate the formation. The initiation pressure is then relieved thus allowing the hydraulic fracture to close. The formation may then be flowed back to produce a substantial volume of the treatment fluid.

Some other embodiments of the invention are compositions including an aqueous liquid, a fluoride source, and an effective amount of an alkane sulfonic acid to adjust the pH of the fluid to about 5 or less. Preferably the pH less than or equal to about 4, more preferably equal to or less than 3, and even more preferably equal to or less than 2.7. In these compositions, hydrofluoric acid may or may not be added to the composition as the fluoride source, and hydrochloric acid may or may not be added to the fluid to adjust pH. Any suitable fluoride source may be used, including, but not limited to, HF, fluoboric acid, ammonium bifluoride, ammonium fluoride, and the like. The compositions may also include boric acid, or at least one organic acid, or any combination thereof. The preferable alkane sulfonic acid is methane sulfonic acid.

Methods and/or compositions of the invention may be used in any suitable application, such as, but not necessarily limited to, matrix stimulation (matrix dissolution, matrix acidizing), acidizing, in industrial and household cleaners, in scale dissolution in wellbores, in filtercake cleanup, in mudcake removal, scale removal, wellbore cleanout, gravel pack cleanout, coiled tubing cleanout, casing cleanout, and the like, and in any other uses of acidic fluids in the oilfield, and elsewhere.

The following examples are presented to illustrate methods of using viscosified formation dissolving fluids to create acidized sandstone fractures, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate some methods of the present invention, as described in the detailed description.

The following slurry test technique was conducted to determine aluminum silicate dissolution in examples 1 through 18. Using a slurry reactor available from Parr Instrument Company, Moline, Ill., the test cell used is a modified 4500 series Parr pressure reactor, with a capacity of IL of fluid. The fluid in the reactor was stirred at 100 rpm using a 4 bladed impeller driven by a magnetic drive-coupled electric motor. The cell was also fitted with a 4" dip tube to enable the acquisition of samples on a timed basis. The cell was also fitted with a backpressure regulator, which was set at 200 psi. The reactor cell and internal parts were constructed of Hastelloy B. All connecting lines were made of 316 SS and the heated transfer flask was made of Teflon coated 316 SS. About 75 mls of distilled water were placed into the reactor cup. A Teflon cup was placed inside of the reactor cup displacing any extra water, then removed, placed on a balance, and the balance was tarred to zero. Approximately 70 grams of kaolinite solids into the Teflon cup and returned to the reactor cup. The reactor cup was then placed on the elevator of the reactor. The elevator was then raised, collars attached to the cup, and clamping screws tightened in a star pattern. Once the collars were securely in place, the elevator was lowered the raised until it was secured into position. The top of the Parr cup was then wrapped with insulating wrap, and the temperature controller was started, and target rotation was set. After opening the bleed valves at the top, and the valve leading into the bottom of the accumulator, approximately 500 g of acid solution were pumped into the accumulator housing using a Masterflex pump. After the valves at the top and bottom of the accumulator were closed, the heater was set to desired temperature. The accumulator was purged under pressure with nitrogen, and that pressure was utilized to transfer the heated fluid to the Parr reactor cup, which started the timing the reaction. Fluid samples were acquired at targeted intervals for ICP analysis.

To conduct each slurry test, approximately 70 g of weighed kaolinite was placed in a Teflon liner and then placed in the cell, which was closed and heated to the test temperature (with a small amount of nitrogen pressure). The test fluid (approximately 500 g of weighed liquid) was pumped into the transfer flask, which was also heated to the test temperature. When both chambers were at the test temperature, the test fluid was transferred to the chamber containing the stirred clay (at 100 rpm) and the test time was started. At appropriate intervals (t=0, 15, 30, 45, 60, 120, 180, and 240 min), small samples of fluid were withdrawn from the chamber, immediately filtered through a 0.20 mm filter, weighed and diluted with 2% nitric acid. The concentrations of dissolved aluminum and silicon were measured in each of those samples using a Perkin-Elmer Optima 2000 DV inductively coupled plasma optical emission spectrometry (ICP-OES) instrument.

For each sample described in following examples, pH measurements were carried out using an Accumet Research AR50 pH meter at typical laboratory test conditions (ambient pressure and temperature of about 25° C.). The instrument was initially calibrated using commercial buffer solutions whose pH values were 4.0, 7.0, and 10.0, respectively. After the fluids were mixed, the pH of the fluids were measured digitally using the AR50 and the pH was recorded after the pH probe was immersed in the solution for at least a minute.

Examples 1-9

In examples 1 through 9, aqueous samples were prepared by mixing with water, 9% by weight formic acid, and 5% by weight ammonium bifluoride, all based upon total fluid weight. For examples 1, 4 and 7, seven percent by weight, based upon total fluid weight, of a solution of 36% by weight hydrochloric acid in water was incorporated, while for examples 3, 6 and 9, seven percent by weight, based upon total fluid weight, of a solution of 70% by weight methane sulfonic acid in water was incorporated. For each example, 500 ml of test sample were mixed with 70 g kaolinite clay. The test temperature for examples 1 through 3 was 80° C., for examples 4 through 6 was 100° C., and examples 7 through 9, 125° C. For each example, the elapsed dissolution test time was about 4 hours, and the test samples were stirred at 100 rpm. Results are given in table II as follows:

TABLE II

|  | Ex. 1 | Ex. 2 | Ex. 3 |
| --- | --- | --- | --- |
| Dissolved Aluminum Concentration | 7580 ppm | 393 ppm | 5450 ppm |
| Dissolved Silicon Concentration | 318 ppm | 3490 ppm | 271 ppm |
| Strong Acid | HCl | — | MSA |
| Test Temperature | 80° C. | 80° C. | 80° C. |
| pH | 1.5 | 3.1 | 1.6 |
|  | Ex. 4 | Ex. 5 | Ex. 6 |
| Dissolved Aluminum Concentration | 4170 ppm | 230 ppm | 5520 ppm |
| Dissolved Silicon Concentration | 377 ppm | 1100 ppm | 337 ppm |
| Strong Acid | HCl | — | MSA |
| Test Temperature | 100° C. | 100° C. | 100° C. |
| pH | 1.5 | 3.1 | 1.6 |
|  | Ex. 7 | Ex. 8 | Ex. 9 |
| Dissolved Aluminum Concentration | 3070 ppm | 1020 ppm | 1810 ppm |
| Dissolved Silicon Concentration | 1150 ppm | 163 ppm | 253 ppm |
| Strong Acid | HCl | — | MSA |
| Test Temperature | 125° C. | 125° C. | 125° C. |
| pH | 1.5 | 3.1 | 1.6 |

Result suggest that the pH of MSA based fluids is quite similar to HCl containing fluids, and as a result aluminium concentration of fluids based upon MSA are also similar to HCl based fluids. Further evidence for the advantage of MSA is solutions made without acid have higher pH and reduced Al concentration, due likely to the undesirable precipitation of aluminate by products.

Examples 10-18

To further illustrate some other embodiments of the invention, in examples 10 through 18, aqueous samples were prepared by mixing with water, 13% by weight citric acid acid, 5% by weight ammonium bifluoride, and 2.5% by weight boric acid, all based upon total fluid weight. For examples 10, 13 and 16, four percent by weight, based upon total fluid weight, of a solution of 36% by weight hydrochloric acid in water was incorporated, while for examples 12, 15 and 18, four percent by weight, based upon total fluid weight, of a solution of 70% by weight methane sulfonic acid in water was incorporated. For each example, 500 ml of test sample were mixed with 70 g kaolinite clay. The test temperature for examples 10 through 12 was 80° C., for examples 13 through 15, 100° C., and examples 16 through 18, 125° C. For each example, the elapsed dissolution test time was about 4 hours, and the test samples were stirred at 100 rpm. Results are provided in table III, as follows:

TABLE III

|  | Ex. 10 | Ex. 11 | Ex. 12 |
| --- | --- | --- | --- |
| Dissolved Aluminum Concentration | 6430 ppm | 3180 ppm | 13100 ppm |
| Dissolved Silicon Concentration | 1040 ppm | 198 ppm | 302 ppm |
| Strong Acid | HCl | — | MSA |
| Test Temperature | 80° C. | 80° C. | 80° C. |
| pH | 2.6 | 3.4 | 2.7 |
|  | Ex. 13 | Ex. 14 | Ex. 15 |
| Dissolved Aluminum Concentration | 7840 ppm | 1650 ppm | 9260 ppm |
| Dissolved Silicon Concentration | 358 ppm | 366 ppm | 556 ppm |
| Strong Acid | HCl | — | MSA |

TABLE III-continued

| Test Temperature | 100° C. | 100° C. | 100° C. |
|---|---|---|---|
| pH | 2.6 | 3.4 | 2.7 |
| | Ex. 16 | Ex. 17 | Ex. 18 |
| Dissolved Aluminum Concentration | 6260 ppm | 5000 ppm | 7840 ppm |
| Dissolved Silicon Concentration | 378 ppm | 435 ppm | 338 ppm |
| Strong Acid | HCl | — | MSA |
| Test Temperature | 125° C. | 125° C. | 125° C. |
| pH | 2.6 | 3.4 | 2.7 |

Although the methods have been described here for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of treating a siliceous subterranean formation penetrated by a wellbore to increase formation permeability, the method comprising injecting into the formation an aqueous acidic mixture formed by blending an aqueous liquid, a fluoride source, and an effective amount of an alkane sulfonic acid to adjust the pH of the fluid to about 3 or less, the alkane sulfonic acid represented by the formula:

$$R^1-SO_3H$$

wherein $R^1$ represents an unbranched, a branched or a cyclic alkyl residue.

2. The method of claim 1 wherein the pH is less than or equal to about 2.7.

3. The method of claim 1 provided that hydrofluoric acid is not added to the fluid as the fluoride source.

4. The method of claim 1 provided that hydrochloric acid is not added to the fluid to adjust pH.

5. The method of claim 1 wherein fluoboric acid is added to the fluid as the fluoride source.

6. The method of claim 1 wherein ammonium bifluoride is added to the fluid as the fluoride source.

7. The method of claim 6 wherein the ammonium bifluoride is present in an amount between about 0.5 and about 6 weight percent based upon total fluid weight, preferably between about 1 and about 5 weight percent based upon total fluid weight, most preferably between about 3 and about 5 weight percent based upon total fluid weight.

8. The method of claim 1 wherein ammonium fluoride is added to the fluid as the fluoride source, and wherein the ammonium fluoride is present in an amount between about 1 and about 8 weight percent based upon total fluid weight, preferably between about 3 and about 7 weight percent based upon total fluid weight, and most preferably between about 5 and about 7 weight percent based upon total fluid weight.

9. The method of claim 1 wherein the fluid further comprises boric acid.

10. The method of claim 1 wherein the fluid further comprises an organic acid.

11. The method of claim 10 wherein the organic acid is formic acid, acetic acid, lactic acid, glycolic acid, sulfamic acid, malic acid, citric acid, tartaric acid, maleic acid, methylsulfamic acid, chloroacetic acid.

12. The method of claim 1 further comprising a chelating acid selected from the group consisting of maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriamine-pentaacetic acid, ammonium salts thereof, lithium salts thereof, sodium salts thereof, and mixtures thereof.

13. The method of claim 1 wherein the fluid further comprises an amidoamine oxide based surfactant.

14. The method of claim 1 wherein the fluid further comprises a polymer selected from the group of substituted lactide polymers, an unsubstituted lactide polymers, glycolide polymers, polylactic acid polymers, polyglycolic acid polymers, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid or hydroxycarboxylic acid-containing moieties, or any mixtures thereof.

15. The method of claim 1 wherein a fluoride free acid preflush is injected prior to the injection into the formation of the aqueous acidic mixture, wherein the preflush is injected to substantially remove carbonates present within the mineralogy of the formation zone to be treated.

16. The method of claim 1 further comprising injecting a viscosified acid based fluid, whereby the injection of the viscosified acid based fluid creates a fracture within the formation.

17. The method of claim 16 further comprising injecting a viscosified fluid after the injection of the viscosified acid based fluid.

18. A method of treating a subterranean formation penetrated by a wellbore to increase formation permeability, the method comprising injecting into the formation an effective amount of an aqueous acidic mixture formed by blending an aqueous liquid, ammonium bifluoride, and an alkane sulfonic acid, the alkane sulfonic acid represented by the formula:

$$R^1-SO_3H$$

wherein $R^1$ represents an unbranched, a branched or a cyclic alkyl residue.

19. A method of treating a subterranean formation penetrated by a wellbore to increase formation permeability, the method comprising injecting into the formation an effective amount of an aqueous acidic mixture formed by blending an aqueous liquid, fluoride source, and methane sulfonic acid.

* * * * *